June 14, 1960 S. A. COGSDILL 2,940,367
DEBURRING TOOL
Filed March 20, 1956
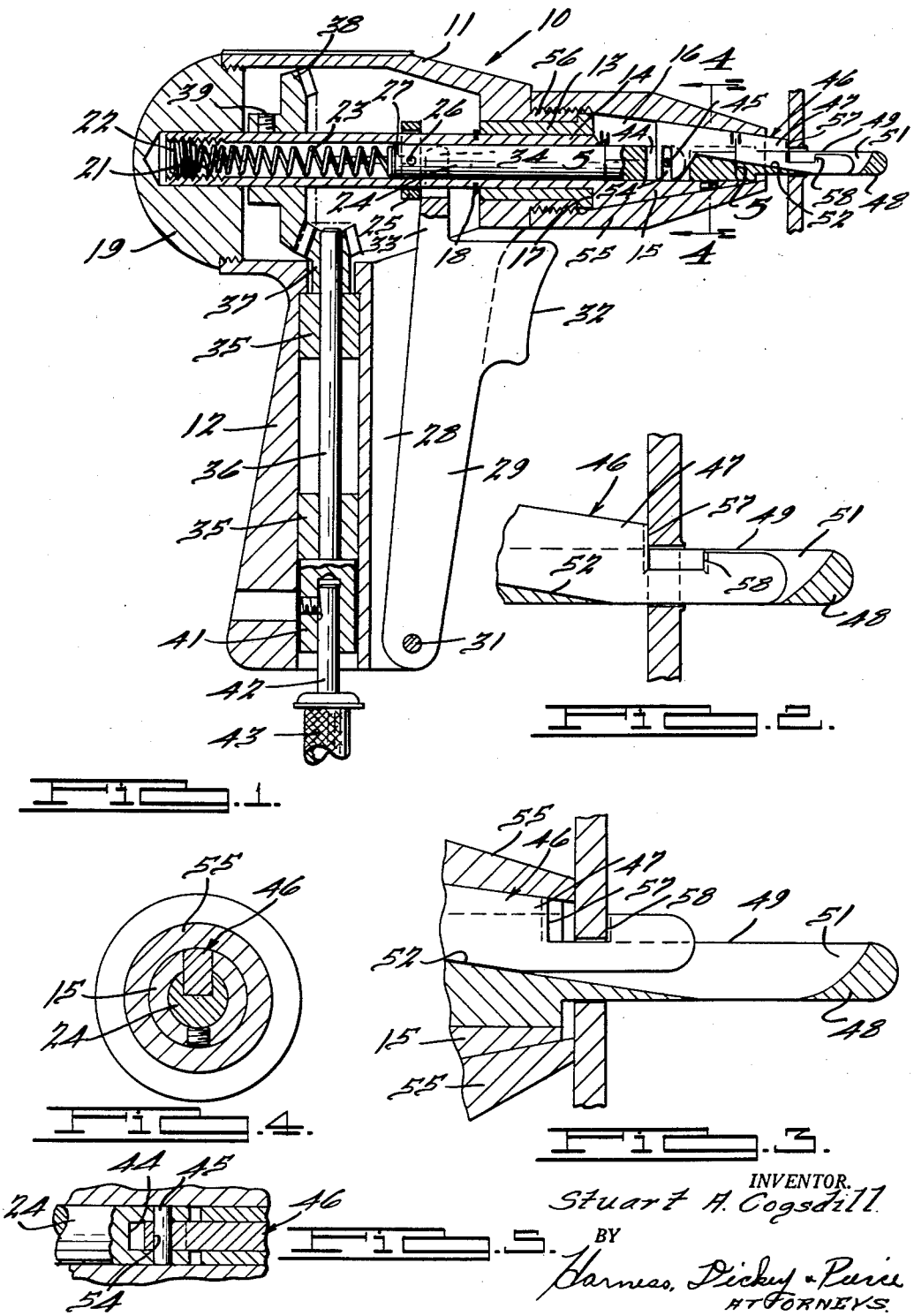
INVENTOR.
Stuart A. Cogsdill
BY
Harness, Dickey & Pierce
ATTORNEYS

United States Patent Office 2,940,367
Patented June 14, 1960

2,940,367
DEBURRING TOOL

Stuart A. Cogsdill, Orchard Lake, Mich., assignor to Cogsdill Tool Products, Inc., Oak Park, Mich., a corporation of Michigan Filed Mar. 20, 1956, Ser. No. 572,699

9 Claims. (Cl. 90—12)

This invention relates to deburring tools, and particularly to a deburring tool in combination with an operating device therefor.

Difficulty has been experienced heretofore in deburring the edges of apertures in thin sheet material, particularly soft material such as aluminum and copper sheets. The tool of the present invention overcomes this difficulty by presenting one edge under adjustable spring pressure to one side of the sheet for deburring the metal extending from the sheet at the aperture end and through manipulation of a trigger to advance a cutting edge to a position for deburring the metal on the opposite edge of the aperture. The tool has a body with a pilot end through one side of which a slot extends in which the blade nests. The blade and base of the slot are sloped to cause the blade to move outwardly when drawn backwardly within the slot. The operating device for the blade comprises a housing in which a rotatable tubular sleeve is mounted. The sleeve carries a rod and a spring, the tension of the spring being adjustable for urging the rod toward the blade end. The forward end of the housing has a thread on which a conical cap is secured, the cap engaging a conical end which has the same slope as the slot in the body and pilot. The forward end of the rod is slotted and has a pin extending therethrough. A slot in the side of the rear end of the blade extends in the slot in the rod over the pin. A ring is provided about the rotatable sleeve having a pin extending through a slot in the sleeve and through the rod, and a trigger on the handle extending from the body has a bifurcated end engagin the ring for moving the rod rearwardly which draws the blade along the sloping surface to cause it to advance a forward cutting edge outwardly of the pilot end to engage and remove the burr on the forward side of the aperture. Remote motor means may be employed for operating through a flexible shaft for driving the sleeve in rotation or a fluid operated motor employing a gas, liquid, or electricity, may be supported by the housing for directly driving the sleeve.

Accordingly, the main objects of the invention are: to provide a deburring tool having a blade and pilot end supported by a driving device having a trigger which moves the blade rearwardly and causes a forward cutting edge on the blade to move outwardly of the pilot end; to provide an operating device for a blade which rotates a sleeve containing an axially movable rod connected with the blade and actuated by a trigger to move a forward cutting edge of the blade outwardly into cutting position; to provide a tool of the deburring type with a slotted pilot in which a blade containing a forward cutting edge is retracted by a rod carried by a sleeve having a spring therein which applies a force for controlling the pressure on a cutting edge of the blade which extends outwardly of the cutting edge within the pilot, and, in general, to provide a deburring tool and operating device therefor which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a sectional view of a deburring tool and operating device therefore embodying features of the present invention;

Fig. 2 is an enlarged broken view of the forward portion of the deburring tool illustrated in Fig. 1 when deburring the edge of the aperture on the face thereof adjacent to the tool;

Fig. 3 is a view of the structure illustrated in Fig. 2, with the deburring tool in position for cutting a burr on the opposite side of the aperture from the side being deburred in Fig. 2;

Fig. 4 is an enlarged sectional view of the structure illustrated in Fig. 1, taken on the line 4—4 thereof, and Fig. 5 is an enlarged sectional view of the structure illustrated in Fig. 1, taken on the line 5—5 thereof.

In the figures, an operating device 10 for a deburring tool is illustrated, comprising a housing 11 for the driving means of the device having a handle portion 12 extending downwardly therefrom. A sleeve bearing 13 is provided at the forward end of the housing 11 for supporting a sleeve 14 having a forward end 15 of truncated conical shape containing a slot 16. A shoulder 17 at the base of the truncated conical portion 15 abuts the bearing 13 and prevents the sleeve from moving rearwardly. A split ring 18 rearwardly of the bearing 13 disposed in a slot in the sleeve prevents the forward movement of the sleeve. The rear end of the sleeve 14 extends within a cap 19 which is threaded in the rear end of the housing 11. The sleeve has an internal thread 21 at the rear end containing a screw 22 which engages the end of a spring 23 and adjusts the tension thereon for applying a predetermined load to a longitudinally movable rod 24 disposed within the sleeve. The rod is attached to a collar 25 about the sleeve 14 by a pin 26 which extends through diametrically disposed slots 27 in the sleeve for permitting the rod 24 to move within the sleeve the length of the slots 27.

The handle 12 has a slot 28 in its forward face in which a trigger 29 is mounted on a pivot 31. A finger engaging extension 32 is provided on the upper end of the trigger 29 and an upward projecting portion 33 has a bifurcated end 34 disposed about the sleeve 14 in position to engage the ring 25. When the trigger is pulled rearwardly, the bifurcated end 34 engages the ring 25 and moves the ring and rod 24 to the rear against the tension of the spring 23. The handle 12 contains bearings 35 for a shaft 36 having a bevel gear 37 on the inner end in engagement with teeth of a bevel gear 38 which is secured to the sleeve 14 in a suitable manner, herein illustrated as by a setscrew 39. The end 41 of the shaft is connected to an end 42 of a flexible driving element 43 which produces the rotation of the sleeve 14 from a remote power source. It is to be understood that a motor may be directly mounted within the housing 11 in engagement with the sleeve 14 for operating the sleeve 14 at a predetermined speed. The conduit for the fluid or electric current will extend through the handle 12 to the motor supported by the body 11.

The forward end of the rod 24 has a centrally disposed slot 44, and a pin 45 extends through the rod and slot on the diameter of the rod in perpendicular relation thereto. A deburring tool 46 embodies a blade 47 and a pilot end 48, forming a set which is provided for different diameters, being removably supported by the head 15 of the sleeve 14, with the blade engaged by the pin 45 of the rod 24. The pilot end 48 has a cylindrical body portion 49 containing a slot 51 in extension of the slot 16 on one side of the head 15. The bottoms 52 of the slots 16 and 51 slope at an angle to the axis of the rod 24 on the same slope as the surface of the head 15. The blade 47 is flat and is of a width to extend from the bottom 52 of the slot 51 to the surface of the head 15. The rear end of the blade 47 has a slot 54 therein which receives the pin 45 at the forward end of the rod 24. A cap 55 encloses the head 15 when threaded upon the forward externally threaded end 56 of the housing 11.

The blade has a cutting edge 57 extending laterally beyond the pilot in position to engage a burr at the edge of an aperture adjacent to the operating device when the pilot and forward end of the blade are disposed in an aperture. The amount of pressure which may be applied to the cutting edge 57 for removing the burr is controlled by the tension in the spring 23 which may be changed by adjusting the screw 22 within the rear threaded end of the sleeve 14. After the burr is removed by the cutting edge 57, the trigger 29 is actuated to move the rod 24 to the rear, moving the blade 47 along the slope of the bottom 52 of the slot 16 to cause the forward cutting edge 58 of the blade to move outwardly from a retracted position, as illustrated in Fig. 2, to a position in which the cutting edge engages the burr on the opposite edge of the aperture containing the burr which was removed by the cutting edge 57. The pressure applied by the finger to the trigger 29 causes the cutting edge 58 to advance into the burr, thereby removing the burr. Upon the release of the finger from the trigger, the spring 23 causes the rod 24 to advance forwardly to retract the cutting edge 58 and permit the deburring tool 46 to be withdrawn from the aperture.

The operating device and tool are light in weight and are readily manipulated to advance the tool through an aperture and quickly deburr the ends thereof by advancing the tool against the adjacent face of the sheet and operating the trigger for removing the burr from the opposite side of the sheet. The operating device is so constructed that the tool set embodying the blade and the tapered end containing the pilot may be quickly removed and replaced by a new set of the same or of different diameter.

What is claimed is:

1. The combination with a deburring tool, of a device for operating the tool comprising a housing containing a rotatable sleeve, means for rotating said sleeve, a reciprocable rod within said sleeve, a spring within said sleeve for urging said rod toward the tool end of said housing, a head on the forward end of said sleeve of truncated conical shape having a slot therein, a deburring tool comprising a blade and a pilot end, the latter of which is removably secured to said head for rotation therewith and containing a slot the bottom of which is substantially parallel to said conical portion of said head, said blade resting within said pilot slot and releasably attached to said forward end of said reciprocable rod, and means for retracting said rod and blade within said sleeve and head respectively for moving said blade outwardly of said slot.

2. The combination with a deburring tool, of a device for operating the tool comprising a housing containing a rotatable sleeve, means for rotating said sleeve, a reciprocable rod within said sleeve, a spring within said sleeve for urging said rod toward the tool end of said housing, a head on the forward end of said sleeve of truncated conical shape having a slot therein, a deburring tool comprising a blade and a pilot end, the latter of which is removably secured to said head for rotation therewith and containing a slot the bottom of which is substantially parallel to said conical portion of said head, said blade resting within said pilot slot and releasably attached to the forward end of said reciprocable rod, means for retracting said rod and blade within said sleeve and head respectively, a first cutting edge on said blade extending outwardly beyond the surface of said pilot, and a second cutting edge spaced from said first cutting edge and disposed within the body of said pilot when said blade is in nonretracted position and which is moved therefrom when said retracting means moves it toward the rearmost position along said sloping bottom of said slot.

3. The combination with a deburring tool, of a device for operating the tool comprising a housing containing a rotatable sleeve, means for rotating said sleeve, a reciprocable rod within said sleeve, a spring within said sleeve for urging said rod toward the tool end of said housing, a head on the forward end of said sleeve of truncated conical shape having a slot therein, a deburring tool comprising a blade and a pilot end, the latter of which is removably secured to said head for rotation therewith and containing a slot the bottom of which is substantially parallel to the conical portion of said head, said blade resting within said pilot slot and releasably attached to the forward end of said rod, means for retracting said rod and blade within said sleeve and head respectively, a first cutting edge on said blade extending outwardly beyond the surface of said pilot, a second cutting edge spaced from said first cutting edge and disposed within the body of said pilot when said blade is in nonretracted position, and a cap extending over said head and removably secured to said housing to form a stop on one side of the workpiece as said second cutting edge is moved outwardly of said slot by said sloping bottom thereof toward the opposite side of the workpiece when said rod retracts said blade.

4. A deburring tool comprising a pilot and a blade, said pilot having a slot with the major portion of the base sloping at an angle to the axis of said pilot, said blade being disposed within said slot and having a forward cutting edge disposed within said slot in said pilot when in forward position and a second cutting edge extending outwardly from said pilot with said cutting edges facing each other, said blade engaging said sloping surface at the base of said slot so as to move outwardly when moved rearwardly therein, means for driving said pilot in rotation, and means for moving said blade rearwardly to have it moved outwardly by said sloping base of said slot.

5. A deburring tool comprising a pilot and a blade, said pilot having a slot with the major portion of the base sloping at an angle to the axis of said pilot, said blade being disposed within said slot and having a forward cutting edge disposed within said pilot when in forward position and a second cutting edge extending outwardly from said pilot with the cutting edges facing each other, said blade engaging said sloping surface at the base of said slot so as to move outwardly when moved rearwardly therein, means for driving said pilot in rotation, and means for moving said blade rearwardly to have it moved outwardly by said sloping base of said slot, said rotatable means embodying a sleeve having a truncated conical head to which said pilot is releasably secured, said means for reciprocating said blade embodying a rod disposed in said sleeve having means for releasably engaging said blade.

6. A deburring tool comprising a pilot and a blade, said pilot having a slot with the major portion of the base sloping at an angle to the axis of said pilot, said blade being disposed within said slot and having a forward cutting edge disposed within said pilot when in forward position and a second cutting edge extending outwardly from said pilot with the cutting edges facing each other, said blade engaging said sloping surface at the base of said slot so as to move outwardly when moved rearwardly therein, means for driving said pilot in rotation, means for moving said blade rearwardly to have it moved outwardly by said sloping base of said slot, said rotatable means embodying a sleeve having a truncated conical head to which said pilot is releasably secured, said means for reciprocating said blade embodying a rod disposed in said sleeve having means for releasably engaging said blade, a spring within said sleeve for urging said rod forwardly, and means for adjusting the tension on said spring.

7. A deburring tool comprising a pilot and a blade, said pilot having a slot with the major portion of the base sloping at an angle to the axis of said pilot, said blade being disposed within said slot and having a forward cutting edge disposed within said slot when in forward position and a second cutting edge extending outwardly from said slot with the cutting edges facing each other, said blade engaging said sloping surface at the base of said slot so as to move outwardly when moved rearwardly therein, means for driving said pilot in rotation, means for moving said blade rearwardly to have it moved outwardly by said sloping base of said slot, said rotatable means embodying a sleeve having a truncated conical head to which said pilot is releasably secured, said means for reciprocating said blade embodying a rod disposed in said sleeve having means for releasably engaging said blade, a spring within said sleeve for urging said rod forwardly, means for adjusting the tension on said spring, a housing supporting said sleeve for rotation, and driving means supported by said housing for rotating said sleeve.

8. A deburring tool comprising a pilot and a blade, said pilot having a slot with the major portion of the base sloping at an angle to the axis of said pilot, said blade being disposed within said slot and having a forward cutting edge disposed within said slot when in forward position and a second cutting edge extending outwardly from said slot with the cutting edges facing each other, said blade engaging said sloping surface at the base of said slot so as to move outwardly when moved rearwardly therein, means for driving said pilot in rotation, means for moving said blade rearwardly to have it moved outwardly by said sloping base of said slot, said rotatable means embodying a sleeve having a truncated conical head to which said pilot is releasably secured, said means for reciprocating said blade embodying a rod disposed in said sleeve having means for releasably engaging said blade, a spring within said sleeve for urging said rod forwardly, means for adjusting the tension on said spring, a housing supporting said sleeve for rotation, driving means supported by said housing for rotating said sleeve, a handle on said housing, and a trigger on said housing for moving said rod and blade rearwardly.

9. The combination with an operating device and a deburring tool, said device embodying a rotatable head and retracting means, said deburring tool embodying a blade and a pilot end supported by said rotatable head with said blade engaging said retracting means, said blade having forward and rearward cutting edges, said rearward cutting edge extending beyond the outer surface of said pilot end, said forward cutting edge extending substantially to the outer surface of said pilot end, said pilot end having a slot with the major portion of its bottom sloping at an angle to the axis of the pilot end, said blade being disposed in said slot in engagement with the sloping bottom which moves said forward cutting edge from said pilot end when said blade is moved rearwardly by said retracting means.

References Cited in the file of this patent
UNITED STATES PATENTS

| | | |
|---|---|---|
| 2,314,084 | Fried | Mar. 16, 1943 |
| 2,663,203 | Fried et al. | Dec. 22, 1953 |
| 2,710,000 | Cromer et al. | June 7, 1955 |
| 2,743,521 | Oberhuber et al. | May 1, 1956 |